United States Patent Office 3,439,051
Patented Apr. 15, 1969

3,439,051
2,3-DIHYDRO-1,4-DITHIINS AS STABILIZERS FOR CHLORINATED HYDROCARBONS
Leonard Levine, Lake Jackson, Tex., assignor to The Dow Chemical Company, Midland, Mich., a corporation of Delaware
No Drawing. Filed Jan. 13, 1967, Ser. No. 608,981
Int. Cl. C07d 73/00; C07c 19/02, 17/42
U.S. Cl. 260—652.5                                         8 Claims

ABSTRACT OF THE DISCLOSURE 2,3-dihydro-1,4-dithiins prepared by the condensation of 1,2-ethanedithiol with α-halocarbonyl compounds are effective stabilizers for chlorinated hydrocarbons such as trichloroethylene and methylchloroform.

BACKGROUND

Stabilization of chlorinated solvents used in liquid and vapor degreasing of metals and in dry cleaning of clothes presents numerous difficulties. Particularly serious has been the instability of these solvents under acid conditions. Furthermore, formation of acid impurities is known to be catalyzed by exposure of the solvent to air, moisture, light and certain metals.

Numerous materials have been tested as stabilizers for chlorinated solvents. Among the more effective are p-dioxane, nitromethane, tetrahydrofuran and certain acetylenic alcohols. However, the empirical search for new and improved stabilizers continues.

In 1955 Parham et al. reported in J. Am. Chem. Soc., 77, 1169 (1955) the synthesis of 2,3-dihydro-1,4-dithiin (I) by condensation of 1,2-ethanedithiol with bromoacetal as shown in Equation 1.

(Equation 1)

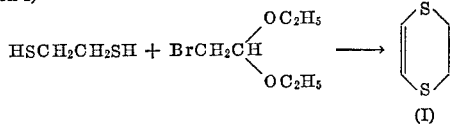

Recently it was found that condensation of 1,2-ethanedithiol with α-halocarbonyl compounds including α-chloroacetone, α-chloroacetophenone and α-chlorocyclohexanone provided a convenient synthesis for a variety of other 2,3-dihydro-1,4-dithiins.

DESCRIPTION OF THE INVENTION

It has now been discovered that 2,3-dihydro-1,4-dithiins of Formula II:

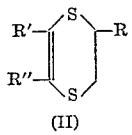

wherein R is H or $C_1$–$C_2$ alkyl; and R' or R'' is H while the other is H, $C_1$–$C_4$ alkyl, or $C_6$–$C_8$ aryl or alkaryl; or R' and R'' together are $(CH_2)_n$— wherein $n$ is 3 or 4, are effective stabilizers for chlorinated aliphatic hydrocarbons. Chlorinated solvents containing a small but effective amount of these 2,3-dihydro-1,4-dithiins have enhanced stability to varied forms of degradation. Thus they stabilize unsaturated solvents such as uninhibited trichloroethylene against oxidation in the rigorous 48 hour accelerated oxidization test. Also they stabilize chlorinated solvents against decomposition introduced by trace quantities of metal as shown by the sensitive methylchloroform-aluminum test. Because of the relatively high boiling point of these dithiins, they are particularly effective as liquid phase stabilizers. Indeed, when desired they can be removed by careful distillation of the solvent.

Typical of the 2,3-dihydro-1,4-dithiins which can be employed to stabilize and protect chlorinated aliphatic hydrocarbons as described herein are: 2,3-dihydro-1,4-dithiin, 2-methyl-2,3-dihydro-1,4-dithiin, 5-methyl-2,3-dihydro - 1,4-dithiin, 5-phenyl-2,3-dihydro-1,4-dithiin, 5-(p-ethylphenyl) - 2,3-dihydro-1,4-dithiin, 5,6,7,8-tetrahydro-1,4-benzodithian, and 5-isobutyl-2,3-dihydro-1,4-dithiin.

Various chlorinated aliphatic hydrocarbons can be stabilized with these dithiins, for example, methylchloroform, carbon tetrachloride, dichloroethylene, trichloroethylene, perchloroethylene, methylene chloride dichloropropylene and similar $C_1$–$C_4$ chlorinated aliphatic hydrocarbons.

In practice good results have been obtained using from 500 to 5000 parts per million (p.p.m.) of the dithiin based on weight of the chlorinated hydrocarbon. However, higher concentrations on the order of 1–5 weight percent may be desirable at times to provide prolonged protection. It is well known that certain solvents such as trichloroethylene are particularly susceptible to oxidative deterioration. But in any event, the optimum effective concentration for a particular solvent can be determined by a few simple tests. Also it is evident that these 2,3-dihydro-1,4-dithiins can be used in conjunction with other conventional stabilizers to enhance their effectiveness.

The following examples further illustrate the present invention. Unless otherwise stated, all parts and percentages are by weight.

Example 1.—Synthesis of 2,3-dihydro-1,4-dithiins (A) 5 - methyl - 2,3 - dihydro-1,4-dithiin.—To 25 parts (0.27 mole) of chloroacetone containing a catalytic amount of p-toluenesulfonic acid and cooled in an ice bath was added dropwise with stirring, 20 parts (0.21 mole) of 1,2-ethanedithiol. After complete addition the mixture was allowed to warm and the reaction completed at 25–35° C. The crude product was diluted with 150 parts of benzene and washed with dilute sodium carbonate and then water. Drying and stripping the benzene gave 25 parts of liquid residue. Distillation at 65–75° C. at 1 mm. Hg gave 16.2 parts (58% yield) of purified 5-methyl-2,3-dihydro-1,4-dithiin. Its structure was confirmed by elemental and spectrographic analyses.

(B) 5-ethyl-2,3-dihydro-1,4-dithiin.—In a similar manner 20 parts (0.19 mole) 1-chloro-2-butanone was condensed with 17 parts (0.18 mole) of 1,2-ethanedithiol at 40–50° C. There was recovered 915 parts (36% yield) of distilled 5-ethyl-2,3-dihydro-1,4-dithiin, B.P. 110–113° C./25 mm.

(C) 5,6,7,8-tetrahydro-1,4-benzodithian.—To 34 parts (0.26 mole) of 2-chlorocyclohexanone was added over 30 minutes 23 parts (0.24 mole) of 1,2-ethanedithiol. The temperature during addition was held at 30–40° C. by cooling as necessary. The product was recovered as described in Example 1(A) yielding 21.5 parts (52%) of the liquid dithiin (II, R+R'=—$(CH_2)_4$—), B.P. 90–98° C./1.0 mm.

(D) 2,3-dihydro-1,4-dithiin.—To 63 parts (0.67 mole) of 1,2-ethanedithiol at 35–50° C. was added over 2.5 hrs. 188 parts (0.85 mole) of 40–45% aqueous chloroacetaldehyde. The mixture was diluted with 250 parts of water and extracted three times with benzene. From the benzene extract was recovered a low yield of 2,3-dihydro-1,4-dithiin, B.P. 35–40° C./1 mm.; $n_D^{25}$ 1.6265; lit. $n_D^{25}$ 1.6237. The structure was confirmed by spectographic analyses.

(E) 5,2(or 3)-dimethyl-2,3-dihydro-1,4-dithiin.—Chloroacetone (49 g., 0.53 mole) was added dropwise during 1½ hr. to 1,2-propanedithiol (54 g., 0.50 mole). Heat was evolved and a cold water bath was used occasionally to maintain temperature of reaction mixture at 40–50° C. Stirring was continued for 2 hrs. after completing the addition. After the usual procedure, distillation yielded 25 g. (34%) of yellow liquid, B.P. 47–54° C. at 0.8 mm.

Examination of the product by infrared and NMR confirmed that the product was the 5,2(or 3)-dimethyl-2,3-dihydrodithiin.

Example 2.—Stabilization of chlorinated hydrocarbons (A) Trichloroethylene.—A standard accelerated oxidative stability test was used in which air was bubbled through trichloroethylene refluxing at 86–7° C. Samples of the trichloroethylene were periodically analyzed for acidity. Typical results are given in Table 1.

TABLE 1

| Additive [1] | Conc. (p.p.m.) | Acidity (p.p.m. HCl) | |
|---|---|---|---|
| | | Initial | After 48 hours |
| Blank | | <2 | 3,000–5,000 |
| IA | 100 | <2 | 500 |
| IA | 1,000 | <2 | [2] 16 |
| IC | 100 | <2 | 70 |
| IC | 1,000 | <2 | [2] 8 |
| ID | 100 | <2 | 600 |
| ID | 1,000 | <2 | 100 |

[1] IA—5-methyl-2,3-dihydro-1,4-dithiin; IC—5,6,7,8-tetrahydro-1,4-benzodithian; ID—2,3-dihydro-1,4-dithiin.
[2] After 44 hours.

(B) Methylchloroform-Al scratch test.—As indicated in Bachtel U.S. 2,811,252, uninhibited methylchloroform is particularly sensitive to aluminum. To screen inhibitors for this reaction, a standard 1100 aluminum coupon is immersed in a test solution of methylchloroform and the additive. The immersed surface of the coupon is scratched twice with a sharp stylus and the exposed aluminum surface observed for 10 minutes. Reaction is shown by a red discoloration of the scratched surface and gas evolution. The effectiveness of a test inhibitor is rated by the minimum active concentration (MAC), e.g. the lowest concentration which prevents visible reaction.

In this test the MAC value for 5-methyl-2,3-dihydro-1,4-dithiin was 0.3–0.4 mole per liter, about equivalent to 1,4-dioxane, a standard inhibitor with a MAC value of about 0.2 in this test.

(C) Methylchloroform-Al reflux test.—In another test, 5.0 ml. of the test methylchloroform is added to 0.54 g. of 16–32 mesh aluminum granules in a 1.0 x 33 cm. test tube. Then the tube is immersed below the liquid level in a bath held at 76° C. to reflux the methylchloroform. If no reaction or discoloration is observed in the normal 24 hr. test period, the inhibitor is rated as effective.

The 2,3-dihydro-1,4 dithiins tested by this method showed effective stabilization at MAC values of about 0.02–0.5 mole per liter corresponding to about 0.3–6.0 g. per 100 ml. methylchloroform. For example, 5,2(or 3)-dimethyl-2,3-dihydro-1,4-dithiin had a MAC value of about 0.3 while 5-methyl-2,3-dihydro-1,4-dithiin had a MAC value of 0.03–0.04. For comparison, 1,4-dioxane has a MAC value of 0.065 in this test.

I claim:
1. A liquid chlorinated aliphatic hydrocarbon stabilized by the addition of a small but effective amount of a 2,3-dihydro-1,4-dithiin of the formula:

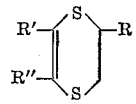

wherein R is H or $C_1$–$C_2$ alkyl; and R' or R'' is H while the other is H, $C_1$–$C_4$ alkyl, or $C_6$–$C_8$ aryl or alkaryl; or R' and R'' together are $-(CH_2)_n-$ wherein $n$ is 3 or 4.

2. The stabilized liquid of claim 1 wherein the dithiin is 5-methyl-2,3-dihydro-1,4-dithiin.
3. The stabilized liquid of claim 1 wherein the chlorinated hydrocarbon is trichloroethylene.
4. The stabilized liquid of claim 1 wherein the chlorinated hydrocarbon is methylchloroform.
5. The stabilized liquid of claim 3 wherein the dithiin is 2,3-dihydro-1,4-dithiin.
6. The stabilized liquid of claim 3 wherein the dithiin is 5,6,7,8-tetrahydro-1,4-benzodithiin.
7. The stabilized liquid of claim 4 wherein the dithiin is 5-methyl-2,3-dihydro-1,4-dithiin.
8. The stabilized liquid of claim 4 wherein the dithiin is a dimethyl-2,3-dihydro-1,4-dithiin prepared by condensation of chloroacetone and 1,2-propanedithiol.

References Cited

UNITED STATES PATENTS 3,073,844   1/1963   Krespan _____ 252—171
3,277,193   10/1966  Fullhart _____ 260—652.5
3,360,575   12/1967  Brown _____ 260—652.5

LEON ZITVER, Primary Examiner.

M. M. JACOB, Assistant Examiner.

U.S. Cl. X.R.

252—172